US012671171B2

(12) United States Patent
Papantonis et al.

(10) Patent No.: US 12,671,171 B2
(45) Date of Patent: Jun. 30, 2026

(54) ELECTRONIC DEVICE WITH CHARGING-COIL INDEPENDENT REAR-FACING ANTENNA

(71) Applicant: Apple Inc., Cupertino, CA (US)

(72) Inventors: Dimitrios Papantonis, Cupertino, CA (US); Eduardo Jorge Da Costa Bras Lima, Santa Clara, CA (US); Yuko N Kanagy, Sunnyvale, CA (US); Jiaxiao Niu, Shanghai (CN); Mario Martinis, Cupertino, CA (US); Andrea Ruaro, San Jose, CA (US); Jayesh Nath, Santa Clara, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 18/324,835

(22) Filed: May 26, 2023

(65) Prior Publication Data

US 2023/0420830 A1      Dec. 28, 2023

Related U.S. Application Data

(60) Provisional application No. 63/355,236, filed on Jun. 24, 2022.

(51) Int. Cl.
| | |
|---|---|
| *G04G 17/04* | (2006.01) |
| *G04C 10/00* | (2006.01) |
| *H01Q 1/27* | (2006.01) |
| *H01Q 1/48* | (2006.01) |
| *H01Q 1/50* | (2006.01) |
| *H01Q 9/04* | (2006.01) |
| *H02J 50/10* | (2016.01) |

(52) U.S. Cl.
CPC ............. *H01Q 1/273* (2013.01); *G04C 10/00* (2013.01); *G04G 17/045* (2013.01); *H01Q 1/48* (2013.01); *H01Q 1/50* (2013.01); *H01Q 9/0407* (2013.01); *H02J 50/10* (2016.02)

(58) Field of Classification Search
CPC ...... G04G 17/00; G04G 17/045; G04C 10/00; H01Q 1/273
See application file for complete search history.

(56) References Cited

U.S. PATENT DOCUMENTS

| | | | |
|---|---|---|---|
| 7,151,496 | B2 | 12/2006 | Casagrande et al. |
| 7,511,679 | B2 | 3/2009 | Araki et al. |
| | | (Continued) | |

*Primary Examiner* — Sean Kayes
(74) *Attorney, Agent, or Firm* — Treyz Law Group, P.C.; Michael H. Lyons

(57) ABSTRACT

An electronic device may have conductive sidewalls and a rear wall. The rear wall may have a first portion mounted to the sidewalls and a second portion protruding away from the first portion to define a cavity. A sensor board may be mounted within the cavity. A coil structure may be mounted within the cavity and surrounding the sensor board. An antenna may have an antenna ground separated from a patch element by an antenna volume. The patch element may include a first conductive trace on the first portion of the rear wall, a second conductive trace on the sensor board, and a conductive interconnect structure that couples the first conductive trace to the second conductive trace. The coil structure may be disposed outside of the antenna to minimize impact of the coil structure on performance of the antenna.

20 Claims, 7 Drawing Sheets

(56)     References Cited

U.S. PATENT DOCUMENTS

| | | | |
|---|---|---|---|
| 9,703,272 | B2 | 7/2017 | Fraser et al. |
| 9,786,981 | B2 | 10/2017 | Mahanfar et al. |
| 9,977,406 | B2 | 5/2018 | Fujisawa |
| 10,418,693 | B2 | 9/2019 | Xu et al. |
| 10,447,080 | B2 | 10/2019 | Jung et al. |
| 10,581,145 | B2 | 3/2020 | Han et al. |
| 10,644,383 | B2 | 5/2020 | Da Costa Bras Lima et al. |
| 11,050,463 | B2 | 6/2021 | Hiemstra et al. |
| 2018/0090826 | A1* | 3/2018 | Da Costa Bras Lima ................. H01Q 9/04 |
| 2020/0194905 | A1* | 6/2020 | Wei ...................... A61B 5/0006 |
| 2021/0099203 | A1* | 4/2021 | Hiemstra ............... H02J 50/10 |
| 2021/0391930 | A1* | 12/2021 | Davis ................... A61B 5/681 |

* cited by examiner

ELECTRONIC DEVICE WITH CHARGING-COIL INDEPENDENT REAR-FACING ANTENNA

This application claims the benefit of U.S. Provisional Patent Application No. 63/355,236, filed Jun. 24, 2022, which is hereby incorporated by reference herein in its entirety.

BACKGROUND

This relates to electronic devices, and more particularly, to electronic devices with wireless circuitry.

Electronic devices are often provided with wireless communications capabilities. To satisfy consumer demand for small form factor electronic devices, manufacturers are continually striving to implement wireless circuitry such as antenna components using compact structures.

At the same time, larger antenna volumes generally allow antennas to exhibit greater efficiency bandwidth. In addition, because antennas have the potential to interfere with each other and with other components in a wireless device, care must be taken when incorporating antennas into an electronic device to ensure that the antennas and wireless circuitry are able to exhibit satisfactory performance over a wide range of operating frequencies.

It would therefore be desirable to be able to provide improved wireless circuitry for electronic devices.

SUMMARY

An electronic device such as a wristwatch may be provided with a housing. The housing may include conductive sidewalls and a rear wall. A display may be mounted to the conductive sidewalls opposite the rear wall. The rear wall may have a first dielectric portion mounted to the conductive sidewalls. The rear wall may have a second dielectric portion that protrudes away from the first dielectric portion and that defines a cavity. A sensor board may be mounted within the cavity. A coil structure may be mounted within the cavity and may laterally surround the sensor board. The coil structure may be used to receive wireless charging signals through the rear wall.

The electronic device may include an antenna that radiates through the rear wall. The antenna may have an antenna ground that includes the conductive sidewalls. The antenna may have a radiating element such as a patch element. The patch element may be separated from the antenna ground by an antenna volume. The patch element may include a first conductive trace on the first dielectric portion of the rear wall. The patch element may include a second conductive trace on the sensor board. The patch element may include a conductive interconnect structure that couples the first conductive trace to the second conductive trace. The conductive interconnect structure may be a conductive bracket or clip. The coil structure may be disposed outside of the antenna volume. Disposing the patch element in this way may maximize the antenna volume and may minimize impact of the coil structure on performance of the antenna.

DETAILED DESCRIPTION

Figure 1:
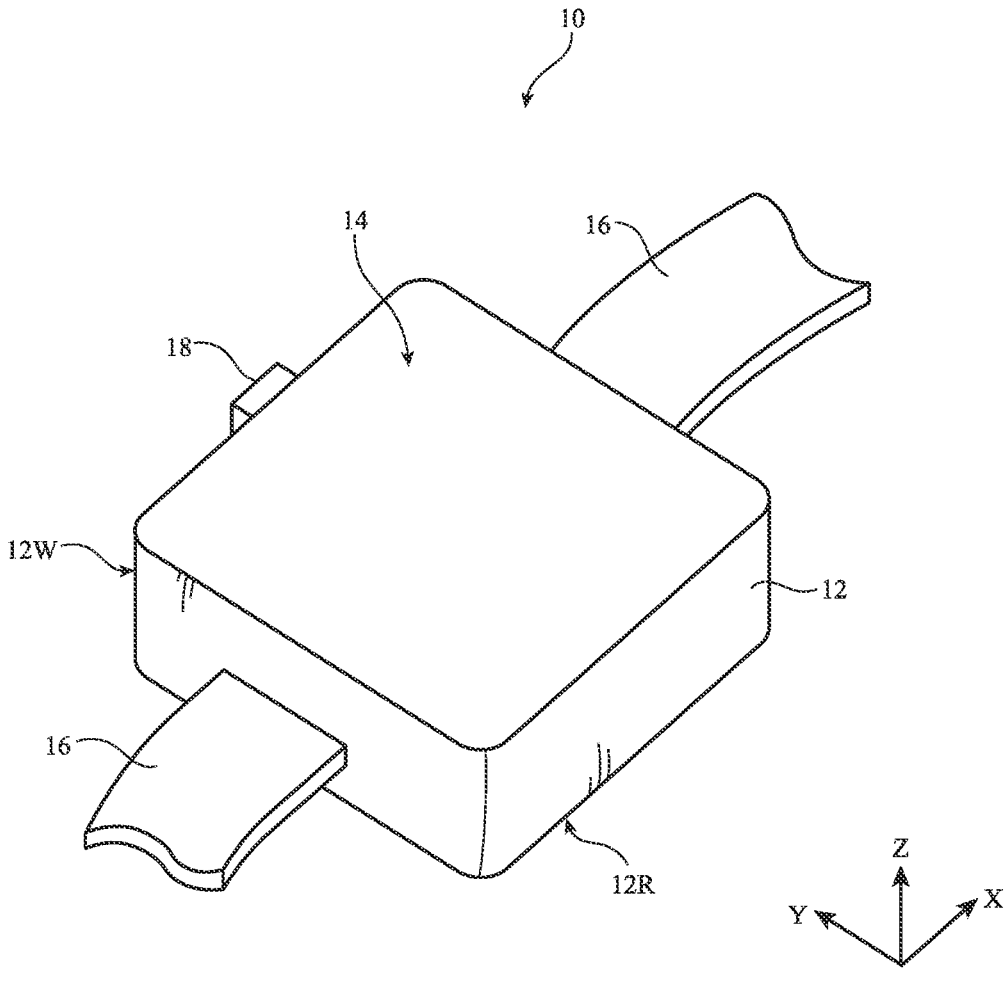
FIG. 1 is a perspective view of an illustrative electronic device with wireless circuitry in accordance with some embodiments.

Electronic devices such as electronic device 10 of FIG. 1 may be provided with wireless circuitry (sometimes referred to herein as wireless communications circuitry). The wireless circuitry may be used to support wireless communications in multiple wireless communications bands. Communications bands (sometimes referred to herein as frequency bands) handled by the wireless circuitry can include satellite navigation system communications bands, cellular telephone communications bands, wireless local area network communications bands, wireless personal area network communications bands, near-field communications bands, ultra-wideband communications bands, or other wireless communications bands.

The wireless circuitry may include one or more antennas. The antennas of the wireless circuitry can include patch antennas (e.g., shorted patch antennas), loop antennas, inverted-F antennas, strip antennas, planar inverted-F antennas, slot antennas, hybrid antennas that include antenna structures of more than one type, or other suitable antennas.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a wristwatch (e.g., a smart watch). Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W or sidewalls formed from other materials. Examples of metal materials that may be used for forming sidewalls 12W include stainless steel, aluminum, silver, gold, metal alloys, or any other desired conductive material. Sidewalls 12W may sometimes be referred to herein as housing sidewalls 12W or conductive housing sidewalls 12W.

Display 14 may be formed at (e.g., mounted on) the front side (face) of device 10. Housing 12 may have a rear housing wall on the rear side (face) of device 10 such as rear housing wall 12R that opposes the front face of device 10. Conductive housing sidewalls 12W may surround the periphery of device 10 (e.g., conductive housing sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic, wood, polymer, combinations of these materials, or any other desired dielectrics.

Rear housing wall 12R and/or display 14 may extend across some or all of the length (e.g., parallel to the X-axis of FIG. 1) and width (e.g., parallel to the Y-axis) of device 10. Conductive housing sidewalls 12W may extend across some or all of the height of device 10 (e.g., parallel to Z-axis). Conductive housing sidewalls 12W and/or rear housing wall 12R may form one or more exterior surfaces of device 10 (e.g., surfaces that are visible to a user of device 10) and/or may be implemented using internal structures that do not form exterior surfaces of device 10 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide housing walls 12R and/or 12W from view of the user).

If desired, housing 12 may include one or more dielectric-filled slots. The dielectric-filled slots, sometimes referred to herein as gaps, openings, or splits, may divide the conductive material in housing 12 into different conductive housing portions. The slots may be filled with dielectric material such as plastic, polymer, sapphire, glass, rubber, or ceramic. In one implementation that is described herein as an example, housing 12 may include a slot that extends along three of the four peripheral edges of device 10 and that separates conductive housing sidewalls 12W from a conductive upper portion of housing 12 (sometimes referred to herein as a conductive turret, conductive top portion, conductive ring, or conductive bezel of housing 12) along three sides of device 10. The slot may be used to separate a radiating element in an antenna of device 10 from ground structures in the antenna. This may allow the radiating element to conduct antenna currents along its edges (e.g., at the slot) that produces electric fields associated with the transmission and/or reception of radio-frequency signals.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. Display 14 may also be force sensitive and may gather force input data associated with how strongly a user or object is pressing against display 14.

Display 14 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies. Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include buttons such as button 18. There may be any suitable number of buttons in device 10 (e.g., a single button, more than one button, two or more buttons, five or more buttons, etc.). Buttons may be located in openings in housing 12 (e.g., openings in conductive housing sidewall 12W or rear housing wall 12R) or in an opening in display 14 (as examples). Buttons may be rotary buttons, sliding buttons, buttons that are actuated by pressing on a movable button member, etc. Button members for buttons such as button 18 may be formed from metal, glass, plastic, or other materials. Button 18 may sometimes be referred to as a crown in scenarios where device 10 is a wristwatch device.

Device 10 may, if desired, be coupled to a strap such as strap 16. Strap 16 may be used to hold device 10 against a user's wrist (as an example). Strap 16 may sometimes be referred to herein as wrist strap 16. In the example of FIG. 1, wrist strap 16 is connected to opposing sides of device 10. Conductive housing sidewalls 12W may include attachment structures for securing wrist strap 16 to housing 12 (e.g., lugs or other attachment mechanisms that configure housing 12 to receive wrist strap 16). Wrist strap 16 may be removable if desired. Configurations that do not include straps may also be used for device 10.

Figure 2:
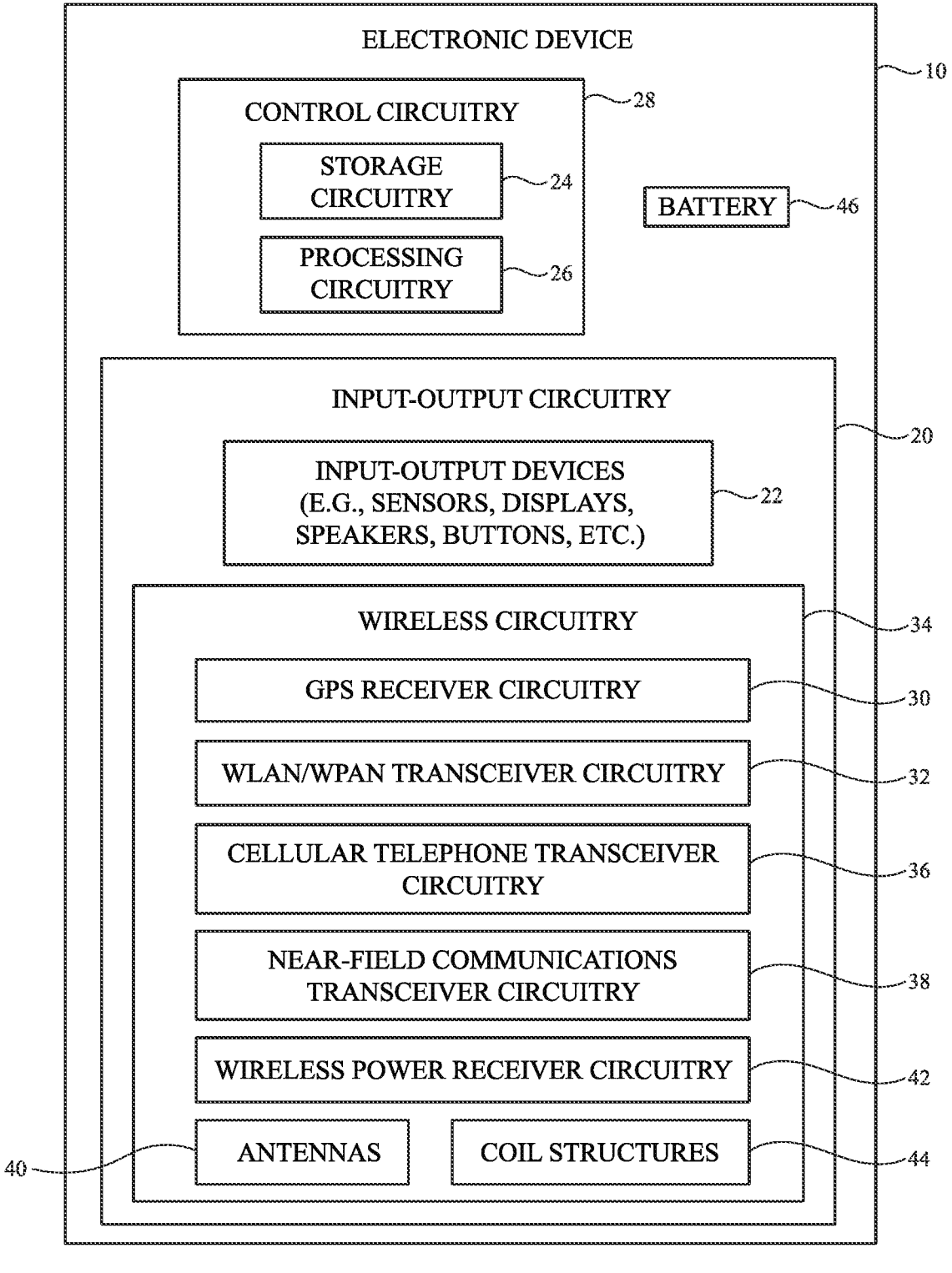
FIG. 2 is a schematic diagram of an illustrative electronic device with wireless circuitry in accordance with some embodiments.

A schematic diagram showing illustrative components that may be used in device 10 is shown in FIG. 2. As shown in FIG. 2, device 10 may include control circuitry 28. Control circuitry 28 may include storage such as storage circuitry 24. Storage circuitry 24 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 26. Processing circuitry 26 may be used to control the operation of device 10. Processing circuitry 26 may include on one or more microprocessors, microcontrollers, digital signal processors, host processors, baseband processor integrated circuits, application specific integrated circuits, central processing units (CPUs), graphics processing units, etc. Control circuitry 28 may be configured to perform operations in device 10 using hardware (e.g., dedicated hardware or circuitry), firmware, and/or software. Software code for performing operations in device 10 may be stored on storage circuitry 24 (e.g., storage circuitry 24 may include non-transitory (tangible) computer readable storage media that stores the software code). The software code may sometimes be referred to as program instructions, software, data, instructions, or code. Software code stored on storage circuitry 24 may be executed by processing circuitry 26.

Control circuitry 28 may be used to run software on device 10 such as external node location applications, satellite navigation applications, internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, MIMO protocols, antenna diversity protocols, satellite navigation system protocols (e.g., global positioning system (GPS) protocols, global navigation satellite system (GLONASS) protocols, etc.), IEEE 802.15.4 ultra-wideband communications protocols or other ultra-wideband communications protocols, etc. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch screens, displays without touch sensor capabilities, buttons, scrolling wheels, touch pads, key pads, keyboards, microphones, cameras, buttons, speakers, status indicators, light sources, audio jacks and other audio port components, vibrators or other haptic feedback engines, digital data port devices, light sensors (e.g., infrared light sensors, visible light sensors, etc.), light-emitting diodes, motion sensors (accelerometers), capacitance sensors, proximity sensors, magnetic sensors, force sensors (e.g., force sensors coupled to a display to detect pressure applied to the display), etc.

Input-output circuitry 22 may include wireless circuitry 34. Wireless circuitry 34 may include wireless power receiving coil structures such as coil structures 44 and wireless power receiver circuitry such as wireless power receiver circuitry 42. Device 10 may use wireless power receiver circuitry 42 and coil structures 44 to receive wirelessly transmitted power (e.g., wireless charging signals) from a wireless power adapter (e.g., a wireless power transmitting device such as a wireless charging mat or other device). Coil structures 44 (sometimes referred to herein as coil 44) may include one or more inductive coils that use resonant inductive coupling (near field electromagnetic coupling) with a wireless power transmitting coil on the wireless power adapter.

The wireless power adapter may pass AC currents through the wireless power transmitting coil to produce a time varying electromagnetic (e.g., magnetic) field that is received as wireless power (wireless charging signals) by coil structures 44 in device 10. An illustrative frequency for the wireless charging signals is 200 kHz. Other frequencies may be used, if desired (e.g., frequencies in the kHz range, the MHz range, or in the GHz range, frequencies of 1 kHz to 1 MHz, frequencies of 1 kHz to 100 MHz, frequencies less than 100 MHz, frequencies less than 1 MHz, etc.). When the time varying electromagnetic field is received by coil structures 44, corresponding alternating-current (AC) currents are induced in the coil structures. Wireless power receiver circuitry 42 may include converter circuitry such as rectifier circuitry. The rectifier circuitry may include rectifying components such as synchronous rectification metal-oxide-semiconductor transistors arranged in a bridge network, and may convert these currents from coil structures 44 into a DC voltage for powering device 10. The DC voltage produced by the rectifier circuitry in wireless power receiver circuitry 42 can be used in powering (charging) an energy storage device such as battery 46 and can be used in powering other components in device 10.

To support wireless communications, wireless circuitry 34 may include baseband circuitry (e.g., one or more baseband processors or other circuitry that operates on baseband signals) and radio-frequency (RF) transceiver circuitry formed from one or more integrated circuits, power amplifier circuitry, low-noise input amplifiers, passive RF components, mixer circuitry, synthesizers, modulators, demodulators, upconverters, downconverters, etc. Wireless circuitry 34 may also include one or more antennas such as antennas 40, transmission lines, and other circuitry for handling RF wireless signals. One or more radio-frequency front end modules may be disposed along the transmission lines if desired. Wireless signals can also be sent using light (e.g., using infrared communications).

Wireless circuitry 34 may include radio-frequency transceiver circuitry for handling transmission and/or reception of radio-frequency signals within corresponding frequency bands at radio frequencies (sometimes referred to herein as communications bands or simply as "bands"). For example, wireless circuitry 34 may include wireless local area network (WLAN) and wireless personal area network (WPAN) transceiver circuitry 32. Transceiver circuitry 32 may handle a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz). Transceiver circuitry 32 may sometimes be referred to herein as WLAN/WPAN transceiver circuitry 32.

Wireless circuitry 34 may use cellular telephone transceiver circuitry 36 for handling wireless communications in frequency ranges (communications bands) such as a cellular low band (LB) from 600 to 960 MHz, a cellular low-midband (LMB) from 1410 to 1510 MHz, a cellular midband (MB) from 1710 to 2170 MHz, a cellular high band (HB) from 2300 to 2700 MHz, a cellular ultra-high band (UHB) from 3300 to 5000 MHz, or other communications bands between 600 MHz and 5000 MHz or other suitable frequencies, 2G bands, 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, or other centimeter or millimeter wave frequency bands between 10-300 GHz (as examples). Cellular telephone transceiver circuitry 36 may handle voice data and non-voice data.

Wireless circuitry 34 may include satellite navigation system circuitry such as Global Positioning System (GPS) receiver circuitry 30. GPS receiver circuitry 30 may receive GPS signals in satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLO- NASS) band, a BeiDou Navigation Satellite System (BDS) band, or other bands. Satellite navigation system signals for receiver circuitry 30 are received from a constellation of satellites orbiting the earth. Wireless circuitry 34 can include circuitry for other short-range and long-range wireless links if desired. For example, wireless circuitry 34 may include circuitry for receiving television and radio signals, paging system transceivers, near field communications (NFC) transceiver circuitry 38 (e.g., an NFC transceiver operating at 13.56 MHz or another suitable frequency), ultra-wideband transceiver circuitry (e.g., transceiver circuitry that operates at ultra-wideband (UWB) frequency bands under the IEEE 802.15.4 protocol and/or other ultra-wideband communications protocols (e.g., a first UWB communications band at 6.5 GHz and/or a second UWB communications band at 8.0 GHz)), transceiver circuitry that operates using communications bands under the family of 3GPP wireless communications standards, transceiver circuitry that operates using communications bands under the IEEE 802. XX family of standards, transceiver circuitry that operates using industrial, scientific, and medical (ISM) bands such as an ISM band between around 900 MHz and 950 MHz or other ISM bands below or above 1 GHz, transceiver circuitry that operates using one or more unlicensed bands, transceiver circuitry that operates using one or more bands reserved for emergency and/or public services, and/or any other desired frequency bands of interest. Wireless circuitry 34 may also be used to perform spatial ranging operations if desired.

In NFC links, wireless signals are typically conveyed over a few inches at most. In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet. Antenna diversity schemes may be used if desired to ensure that the antennas that have become blocked or that are otherwise degraded due to the operating environment of device 10 can be switched out of use and higher-performing antennas used in their place. Multiple-input and multiple-output (MIMO) schemes and/or carrier aggregation (CA) schemes may be used to boost data rates and wireless performance.

Wireless circuitry 34 may include antennas 40. Antennas 40 may be formed using any suitable antenna types. For example, antennas 40 may include antennas with resonating elements that are formed from patch antenna structures (e.g., shorted patch antenna structures), slot antenna structures, loop antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, hybrids of these designs, etc. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time).

Different types of antennas may be used for different bands and combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. If desired, a combination of antennas for covering multiple frequency bands and dedicated antennas for covering a single frequency band may be used. For example, a first antenna 40 in device 10 may be used to handle communications in a WiFi® or Bluetooth® communication band at 2.4 GHz, a GPS L1 band at 1575 MHz, a GPS L5 band at 1176 MHz, and one or more cellular telephone communications bands such as a cellular midband (MB) from 1710 to 2170 MHz, a cellular high band (HB) from 2300 to 2700 MHz, whereas a second antenna 40 in device 10 is used to handle communications in a cellular low band (LB) and the cellular HB.

It may be desirable to implement at least some of the antennas in device 10 using portions of electrical components that would otherwise not be used as antennas and that support additional device functions. As an example, it may be desirable to produce antenna currents in components such as display 14 (FIG. 1), so that display 14 and/or other electrical components (e.g., a touch sensor, near-field communications loop antenna, conductive display assembly or housing, conductive shielding structures, etc.) can serve as part of an antenna for Wi-Fi, Bluetooth, GPS, cellular frequencies, and/or other frequencies without the need to incorporate separate bulky antenna structures in device 10. Conductive portions of housing 12 (FIG. 1) may be used to form part of an antenna ground for one or more antennas 40.

While control circuitry 28 is shown separately from wireless circuitry 34 in the example of FIG. 1 for the sake of clarity, wireless circuitry 34 may include processing circuitry (e.g., one or more processors) that forms a part of processing circuitry 26 and/or storage circuitry that forms a part of storage circuitry 24 of control circuitry 28 (e.g., portions of control circuitry 28 may be implemented on wireless circuitry 34). As an example, control circuitry 28 may include baseband circuitry (e.g., one or more baseband processors), digital control circuitry, analog control circuitry, and/or other control circuitry that forms part of radio wireless circuitry 34. The baseband circuitry may, for example, access a communication protocol stack on control circuitry 28 (e.g., storage circuitry 24) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 34.

Figure 3:
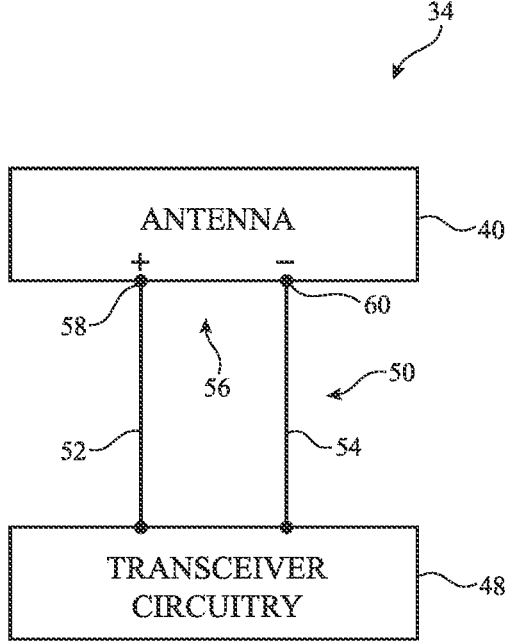
FIG. 3 is a diagram of illustrative wireless circuitry in an electronic device in accordance with some embodiments.

A schematic diagram of wireless circuitry 34 is shown in FIG. 3. As shown in FIG. 3, wireless circuitry 34 may include transceiver circuitry 48 (e.g., cellular telephone transceiver circuitry 36 of FIG. 2, WLAN/WPAN transceiver circuitry 32, etc.) that is coupled to a given antenna 40 using a radio-frequency transmission line path such as radio-frequency transmission line path 50.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line path 50 may include one or more radio-frequency transmission lines (sometimes referred to herein simply as transmission lines). Radio-frequency transmission line path 50 (e.g., the transmission lines in radio-frequency transmission line path 50) may include a positive signal conductor such as signal conductor 52 and a ground signal conductor such as ground conductor 54.

The transmission lines in radio-frequency transmission line path 50 may, for example, include coaxial cable transmission lines (e.g., ground conductor 54 may be implemented as a grounded conductive braid surrounding signal conductor 52 along its length), stripline transmission lines (e.g., where ground conductor 54 extends along two sides of signal conductor 52), a microstrip transmission line (e.g., where ground conductor 54 extends along one side of signal conductor 52), coaxial probes realized by a metalized via, edge-coupled microstrip transmission lines, edge-coupled stripline transmission lines, waveguide structures (e.g., coplanar waveguides or grounded coplanar waveguides), combinations of these types of transmission lines and/or other transmission line structures, etc.

Transmission lines in radio-frequency transmission line path 50 may be integrated into rigid and/or flexible printed circuit boards. In one suitable arrangement, radio-frequency transmission line path 50 may include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Radio-frequency transmission line path 50 may be coupled to antenna feed structures associated with antenna 40. As an example, antenna 40 may form an inverted-F antenna, a planar inverted-F antenna, a patch antenna, a loop antenna, or other antenna having an antenna feed 56 with a positive antenna feed terminal such as terminal 58 and a ground antenna feed terminal such as terminal 60. Positive antenna feed terminal 58 may be coupled to an antenna resonating (radiating) element within antenna 40. Ground antenna feed terminal 60 may be coupled to an antenna ground in antenna 40. Signal conductor 52 may be coupled to positive antenna feed terminal 58 and ground conductor 54 may be coupled to ground antenna feed terminal 60.

Other types of antenna feed arrangements may be used if desired. For example, antenna 40 may be fed using multiple feeds each coupled to a respective port of transceiver circuitry 48 over a corresponding transmission line. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between transceiver circuitry 48 and the positive antenna feed terminals if desired (e.g., to selectively activate one or more positive antenna feed terminals at any given time). The illustrative feeding configuration of FIG. 3 is merely illustrative.

The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to free space through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Device 10 may include multiple antennas that convey radio-frequency signals through different sides of device 10. For example, device 10 may include at least first antenna 40 that conveys radio-frequency signals through the front face of device 10 (e.g., display 14 of FIG. 1) and a second antenna 40 that conveys radio-frequency signals through the rear face of device 10 (e.g., rear housing wall 12R of FIG. 1).

Any desired antenna structures may be used for implementing the antenna 40 that conveys radio-frequency signals through the rear face of device 10. In one suitable arrangement that is sometimes described herein as an example, patch antenna structures may be used for implementing the antenna 40 that conveys radio-frequency signals through the rear face of device 10. Antennas that are implemented using patch antenna structures may sometimes be referred to herein as patch antennas. An illustrative patch antenna that may be used to convey radio-frequency signals through the rear face of device 10 is shown in FIG. 4.

Figure 4:
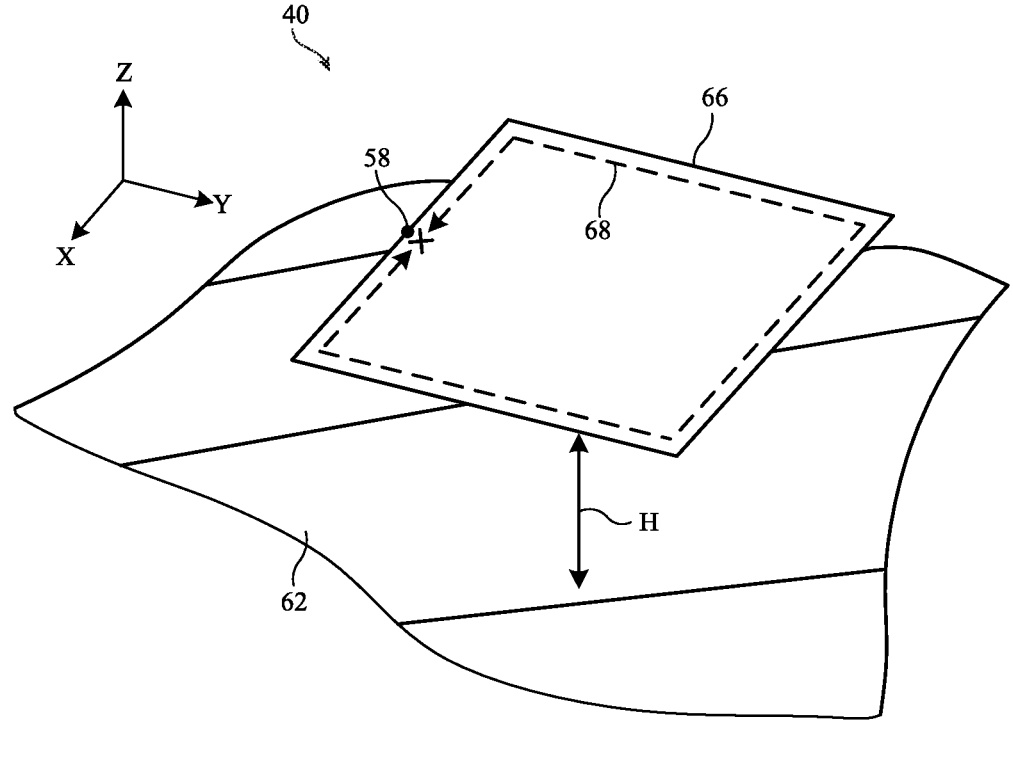
FIG. 4 is a perspective view of an illustrative antenna having a patch element in accordance with some embodiments.

As shown in FIG. 4, antenna 40 may have a radiating patch element such as patch element 66 that is separated from and parallel to an antenna ground such as antenna ground 62 (sometimes referred to herein as ground plane 62 or ground structures 62). Patch element 66 may lie within a plane such as the X-Y plane of FIG. 4 (e.g., the lateral surface area of patch element 66 may lie in the X-Y plane). Patch element 66 may sometimes be referred to herein as patch antenna resonating element 66, patch resonating element 66, patch resonator 66, shorted patch antenna resonating element 66, patch 66, patch radiating element 66, patch antenna radiating element 66, shorted patch antenna radiating element 66, patch radiator 66, antenna resonating element 66, or antenna radiating element 66.

Antenna ground 62 may lie within a plane that is parallel to the plane of patch element 66. Patch element 66 and antenna ground 62 may therefore lie in separate parallel planes that are separated by a distance (height) H. Antenna ground 62 may be formed from conductive traces patterned on a dielectric substrate such as a rigid or flexible printed circuit board substrate, metal foil, stamped sheet metal, electronic device housing structures, or any other desired conductive structures (e.g., ground structures). Patch element 66 may be formed from conductive traces patterned on a dielectric housing wall, conductive traces patterned on a sensor board (e.g., a rigid or flexible printed circuit board), and from conductive interconnect structures (e.g., a conductive bracket) that couples the conductive traces together, as one example.

The length of the sides of patch element 66 may be selected so that antenna 40 resonates (radiates) at desired operating frequencies. For example, the sides of patch element 66 may each have a length that is approximately equal to half of the wavelength of the signals conveyed by antenna 40 (e.g., the effective wavelength given the dielectric properties of the materials surrounding patch element 66). Positive antenna feed terminal 58 may be coupled to patch element 66 (e.g., at a feed edge of patch element 66). Antenna current for antenna 40 may flow along the perimeter of patch element 66, as shown by arrow 68. The antenna current may be produced by positive antenna feed terminal 58 (e.g., during signal transmission) or by incident radio-frequency signals received by antenna 40. During signal reception, the antenna current may pass the radio-frequency signals to transceiver circuitry on device 10 via positive antenna feed terminal 58.

The example of FIG. 4 is merely illustrative. Patch element 66 may have a square shape in which all of the sides of patch element 66 are the same length or may have a different rectangular shape. Patch element 66 may be formed in other shapes having any desired number of straight and/or curved edges (e.g., a round shape, an elliptical shape, a polygonal shape, etc.). Patch element 66 may be shorted to antenna ground 62 using one or more grounding structures. Antenna 40 may be implemented using other antenna architectures. Patch element 66 of antenna 40 may be formed from multiple conductive structures in device 10 in a manner that serves to integrate patch element 66 into device 10 in a way that allows antenna 40 to convey radio-frequency signals through the rear face of device 10.

Figure 5:
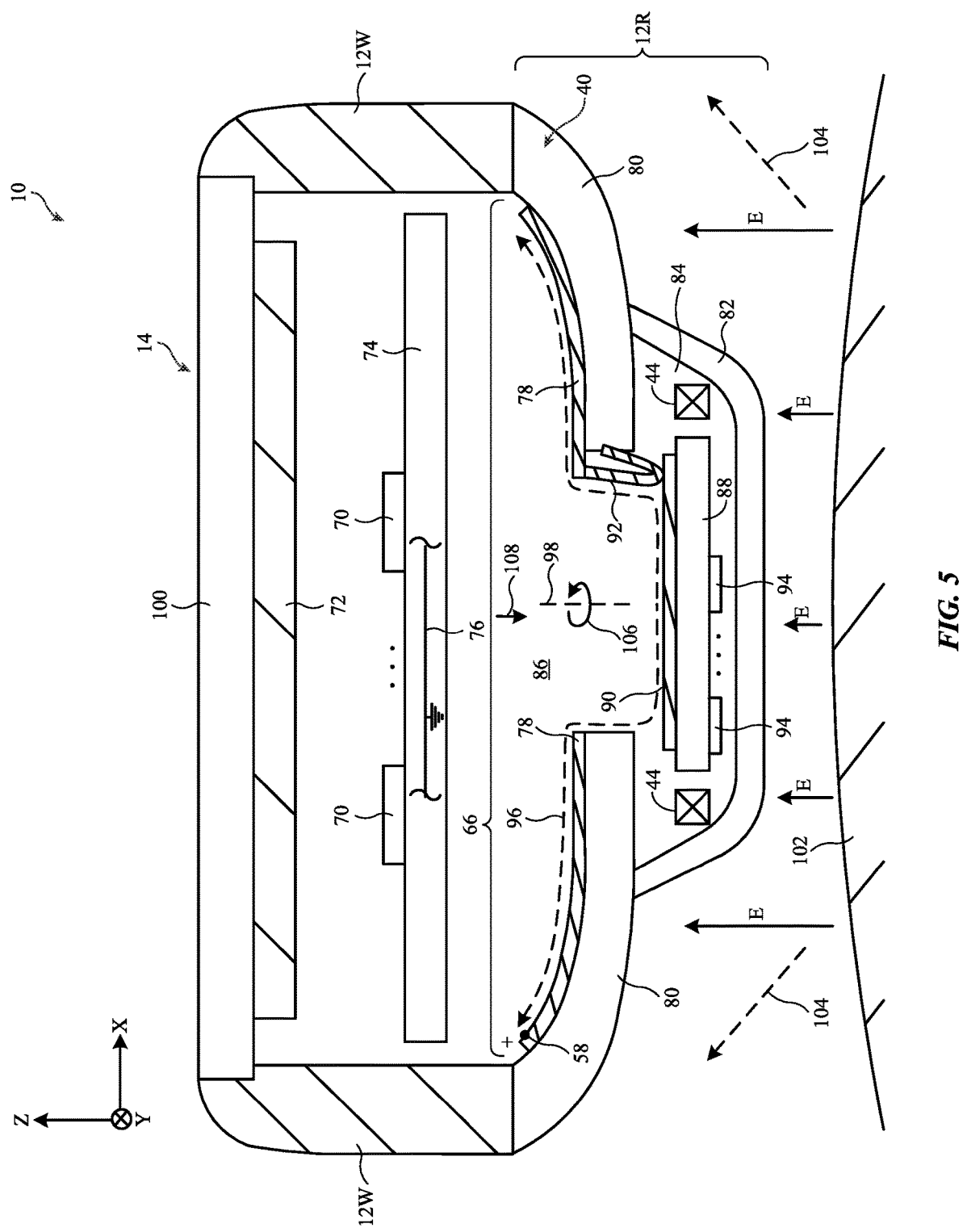
FIG. 5 is a perspective view of an illustrative electronic device having a charging coil and an antenna at a rear face of the electronic device in accordance with some embodiments.

FIG. 5 is a cross-sectional side view showing how patch element 66 may be formed from multiple conductive structures and integrated into device 10 for conveying radio-frequency signals through the rear face of device 10. As shown in FIG. 5, display 14 may form the front face of device 10 whereas rear housing wall 12R forms the rear face of device 10. In the example of FIG. 5, rear housing wall 12R is formed from a dielectric material such as glass, sapphire, zirconia, ceramic, or plastic. This is merely illustrative and, if desired, rear housing wall 12R may also include conductive portions (e.g., a conductive frame surrounding one or more dielectric windows in rear housing wall 12R, conductive cosmetic layers, etc.). Conductive housing sidewalls 12W may extend from the rear face to the front face of device 10 (e.g., from rear housing wall 12R to display 14).

Display 14 may include a display module 72 (sometimes referred to herein as display stack 72, display assembly 72, display board 72, or active area 72 of display 14) and a display cover layer 100. Display module 72 may, for example, form an active area or portion of display 14 that displays images and/or receives touch sensor input. The lateral portion of display 14 that does not include display module 72 (e.g., portions of display 14 formed from display cover layer 100 but without an underlying portion of display module 72) may sometimes be referred to herein as the inactive area or portion of display 14 because this portion of display 14 does not display images or gather touch sensor input.

Display module 72 may include conductive components (sometimes referred to herein as conductive display structures) that are used in forming portions of an antenna that radiates through the front face of device 10 (e.g., an antenna having a radiating element such as a shorted patch element that includes display module 72 and conductive portions of housing 12). Display cover layer 100 may be formed from an optically transparent dielectric such as glass, sapphire, ceramic, or plastic. Display module 72 may display images (e.g., emit image light) through display cover layer 100 for view by a user and/or may gather touch or force sensor inputs through display cover layer 100. If desired, portions of display cover layer 100 may be provided with opaque masking layers (e.g., ink masking layers) and/or pigment to obscure the interior of device 10 from view of a user.

Substrates such as substrate 74 (e.g., a rigid or flexible printed circuit board, integrated circuit or chip, integrated circuit package, etc.) may be located within the interior of device 10. Substrate 74 may be, for example, a main logic board (MLB) or other logic board for device 10. Other components such as components 70 (e.g., components used in forming control circuitry 28 and/or input-output circuitry 20 of FIG. 2, battery 46, etc.) may be mounted to substrate 74 and/or elsewhere within the interior of device 10.

Rear housing wall 12R may extend across substantially all of the length and width of device 10 (e.g., in the X-Y plane). Rear housing wall 12R may be optically opaque or optically transparent or may include both optically opaque and optically transparent portions (e.g., rear housing wall 12R may include optically transparent windows in an otherwise optically opaque member). In the example of FIG. 5, rear housing wall 12R includes a first dielectric wall 80 and a dielectric protrusion formed from a second dielectric wall 82 that extends vertically downward from first dielectric wall 80. First dielectric wall 80 and second dielectric wall 82 may sometimes also be referred to herein respectively as first and second portions of rear housing wall 12R or first and second dielectric portions of rear housing wall 12R.

First dielectric wall 80 may define part of the interior cavity of device 10. Second dielectric wall 82 may define part of a sensor cavity 84 between first dielectric wall 80 and second dielectric wall 82. First and second dielectric walls 80 and 82 may be formed from ceramic, plastic, glass, sapphire, and/or any other desired dielectric materials. First and second dielectric walls 80 and 82 may be formed from respective portions of a single integrated piece of dielectric material or may be formed from separate pieces of dielectric material that have been adhered, joined, fused, attached, secured, or otherwise affixed together at the rear face of device 10. While the example of FIG. 5 shows a portion of first dielectric wall 80 protruding over sensor cavity 84, this is merely illustrative. If desired, first dielectric wall 80 may extend continuously into second dielectric wall 82 without extending over sensor cavity 84. First dielectric wall 80 may substantially extend within a first plane. Second dielectric wall 82 may substantially extend within a second plane below the first plane (e.g., parallel to the first plane) and may include sidewalls that couple the portion of second dielectric wall 82 in the second plane to first dielectric wall 80. This is merely illustrative and, in general, second dielectric wall 82 and thus sensor cavity 84 may have any desired shape.

The protrusion formed by second dielectric wall 82 (e.g., sensor cavity 84) may accommodate one or more components for device 10. For example, a sensor board such as sensor board 88 may be disposed within sensor cavity 84 (e.g., between the first and second planes). Device 10 may have a central axis 98 that extends (e.g., orthogonally) through a lateral surface of sensor board 88. Sensor board 88 may be separated from second dielectric wall 82, pressed against second dielectric wall 82, or adhered to second dielectric wall 82, etc. Sensor board 88 may be disposed entirely within sensor cavity 84 or, if desired, part of sensor board 88 may be disposed above sensor cavity 84 (e.g., within the interior cavity of device 10 at or above the first plane).

Sensor board 88 may include a rigid printed circuit board, flexible printed circuit, integrated circuit chip, integrated circuit package, plastic substrate, or other substrates for supporting one or more sensors 94 (e.g., one or more sensors 94 may be mounted to sensor board 88). Sensors 94 may, for example, include sensors in input-output devices 22 of FIG. 2. Sensors 94 may include optical sensors such as one or more optical transmitters and one or more optical receivers. The optical transmitters may transmit optical signals (e.g., visible light, infrared light, etc.) through one or more optically transparent windows or portions of second dielectric wall 82. The optical receivers may receive optical signals through the one or more optically transparent windows or portions of second dielectric wall 82. The optical sensors may, for example, be used to measure a user's heart rate or blood oxygen level when the user is wearing device 10 on their body. If desired, sensors 94 may include sensor electrodes that protrude through second dielectric wall 82 such as electrocardiogram (ECG or EKG) electrodes. Sensor circuitry on sensor board 88 may sense the electrical activity of a user's heart using the sensor electrodes while the user wears device 10, for example. Sensors 94 may also include one or more sensors such as a light sensor, proximity sensor, touch sensor, or other sensors.

Coil structures 44 may also be disposed within sensor cavity 84 (e.g., between the first and second planes). Coil structures 44 may laterally (circumferentially) surround sensor board 88 and central axis 98. Coil structures 44 may include windings of wire that wrap around central axis 98 and sensor board 88 (e.g., in planes parallel to the X-Y plane), may include one or more windings of wire warped around a ferrite core that laterally extends around central axis 98, or may include any other desired inductive coil structures for receiving wireless charging signals. Coil structures 44 may include a single conductive coil (e.g., an inductive coil) or more than one conductive coil. In one suitable arrangement, coil structures 44 may include a first coil with windings that coil (wind) around central axis 98 (e.g., in the direction of arrow 106) and a second coil with windings that extend perpendicular to the windings in the first coil. The windings in the first and second coils may include conductive wire (e.g., copper wire), conductive traces, or any other desired conductive material. In general, coil structures 44 may include any desired number of windings of wire, any desired number of coils, any desired number of ferrite cores, etc. If desired, a ferrite shield structure (not shown) that helps to electromagnetically shield coil structures 44 from other components in device 10 may be layered over coil structures 44. Coil structures 44 may receive wireless charging signals through second dielectric wall 82 (e.g., when device 10 is placed on a wireless power adapter or other wireless power transmitting device). The wireless charging signals may induce currents on coil structures 44 that are used by wireless power receiver circuitry 42 for charging battery 46 (FIG. 2).

Antenna 40 may be disposed within device 10 for radiating through rear housing wall 12R. In general, the volume of antenna 40 may be proportional to the efficiency bandwidth of the antenna. Antenna 40 may include a patch element 66 and an antenna ground (e.g., antenna ground 62 of FIG. 4) separated from patch element 66 by antenna volume 86. Ground traces 76 may be formed on substrate 74 and may form part of the antenna ground for antenna 40 (e.g., antenna ground 62 of FIG. 4). Conductive housing sidewalls 12W may also form part of the antenna ground for antenna 40 (e.g., ground traces 76 on substrate 74 may be electrically shorted to conductive housing sidewalls 12W). Conductive portions of other components in device 10 may also form part of the antenna ground for antenna 40 (e.g., ground traces 76 on substrate 74, conductive housing sidewalls 12W, and/or conductive portions of other components in device 10 may be held at a ground or reference potential).

To maximize antenna volume 86, patch element 66 may be distributed between multiple conductive structures and planes in device 10. As shown in FIG. 5, patch element 66 may include first conductive traces 78, second conductive traces 90, and a conductive interconnect structure such as conductive interconnect structure 92 (sometimes referred to herein simply as conductive interconnect 92). First conductive traces 78 may sometimes be referred to herein in the singular as first conductive trace 78. Similarly, second conductive traces 90 may sometimes be referred to herein in the singular as second conductive trace 90. First conductive traces may be patterned onto the interior surface of first dielectric wall 80 (e.g., using a laser-direct-structuring (LDS) process). Second conductive traces 90 may be patterned onto a surface of sensor board 88. In other implementations, first conductive traces 78 and/or second conductive traces 90 may be patterned onto one or more flexible printed circuits that are layered over first dielectric wall 80 and/or sensor board 88.

Conductive interconnect structure 92 may couple first conductive traces 78 on first dielectric wall 80 to second conductive traces 90 on sensor board 88. First conductive traces 78 may laterally extend around central axis 98 (e.g., in the direction of arrow 106). To maximize the antenna volume 86 of antenna 40, first conductive traces 78 may extend across all or substantially all of the interior surface of first dielectric wall 80. Similarly, second conductive traces 90 may extend across all or substantially all of the lateral surface of sensor board 88. If desired, a portion of first conductive traces 78 may overlap a portion of second conductive traces 90 (e.g., when viewed in the −Z direction).

Conductive interconnect structure 92 may include a conductive spring, a conductive pin, metal wire, stamped sheet metal, a conductive pin, conductive adhesive, solder, a weld, a conductive clip, a wire, conductive foam, conductive traces (e.g., on an underlying flexible printed circuit), a conductive bracket, conductive portions of the housing of device 10, and/or any other desired conductive material that electrically couplers first conductive traces 78 to second conductive traces 90. In one implementation that is described herein as an example, conductive interconnect structure 92 is a conductive bracket or clip (e.g., a bent piece of metal) that extends from first conductive traces 78 and that presses against second conductive traces 90, thereby creating a robust and stable electrical connection between first conductive traces 78 and second conductive traces 90.

Positive antenna feed terminal 58 may be coupled to first conductive traces 78. Corresponding antenna currents may flow along first conductive traces 78, through conductive interconnect structure 92, and along second conductive traces 90 as shown by arrow 96. In this way, first conductive traces 78, second conductive traces 90, and conductive interconnect structure 92 may collectively form the patch element 66 of antenna 40. First conductive traces 78, second conductive traces 90, and conductive interconnect structure 92 may therefore resonate at radio frequencies to convey radio-frequency signals through rear housing wall 12R. In general, only one conductive interconnect structure is needed to electrically integrate second conductive traces 90 into patch element 66. However, this is merely illustrative. If desired, there may be more than one conductive interconnect structure 92 that couples first conductive traces 78 to second conductive traces 90 (e.g., at different points around central axis 98).

Distributing patch element 66 across both the interior surface of first dielectric wall 80 and sensor board 88 within sensor cavity 84 in this way (e.g., using conductive interconnect structure 92) may serve to maximize the antenna volume 86 of antenna 40 and thus its efficiency bandwidth. By disposing coil structures 44 within sensor cavity 84 below first conductive traces 78, coil structures 44 are disposed within device 10 but outside (external to) antenna volume 86. In other words, antenna currents may flow along patch element 66 (e.g., as shown by arrow 96) without crossing the plane of coil structures 44. This may prevent coil structures 44 from interfering with the transmission and/or reception of radio-frequency signals by antenna 40 while coil structures 44 receive wireless charging signals and/or while coil structures 44 are inactive, thereby maximizing the wireless performance of antenna 40. This may also help to prevent antenna 40 from interfering with the reception of wireless charging signals by coil structures 44, thereby maximizing wireless charging performance. By disposing antenna 40 at rear housing wall 12R in this way, the vertical height of device 10 (e.g., parallel to the Z-axis of FIG. 4) may be shorter than would otherwise be possible in scenarios where the corresponding antenna resonating element is located elsewhere on device 10 (while still allowing antenna 40 to exhibit satisfactory antenna efficiency).

In practice, the wireless performance of antenna 40 may be optimized by the presence of an external object adjacent to rear housing wall 12R. For example, the presence of the user's wrist 102 adjacent to rear housing wall 12R when the user is wearing device 10 may enhance the wireless performance of antenna 40. During operation, antenna 40 may transmit and/or receive radio-frequency signals having electric fields (E) that are oriented normal to the surfaces of rear housing wall 12R and wrist 102. These signals may sometimes be referred to as surface waves, which are then propagated along the surface of wrist 102 and outwards, as shown by paths 104 (e.g., patch element 60 and wrist 102 may serve as an electromagnetic waveguide that directs the surface waves outwards). This may allow the radio-frequency signals conveyed by antenna 40 to be properly received by external communications equipment (e.g., a wireless access point or base station) even though antenna 40 is located close to wrist 102 and typically pointed away from the external communications equipment.

Figure 6:
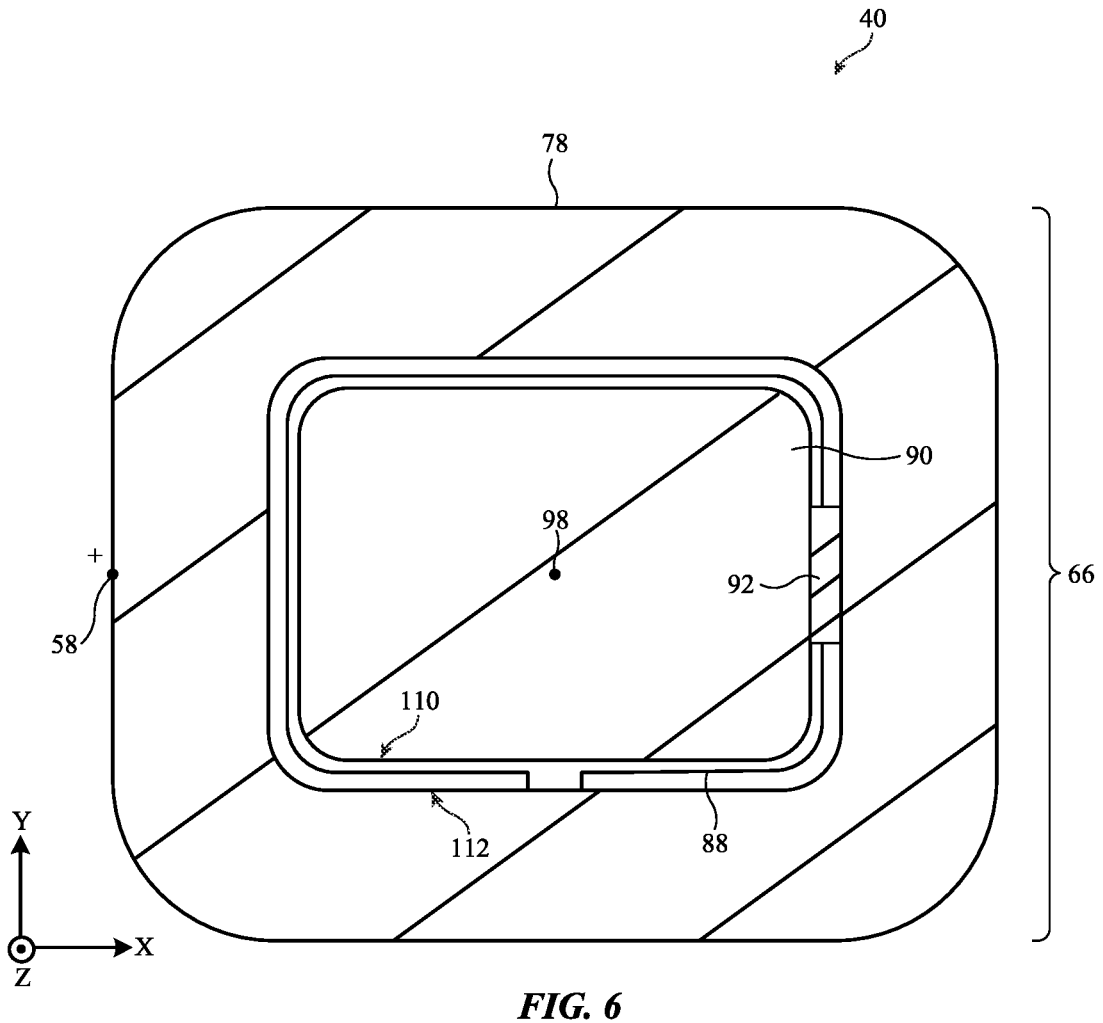
FIG. 6 is a top view of an illustrative antenna resonating element formed from conductive traces on a rear housing wall, conductive traces on a sensor board, and a conductive bracket in accordance with some embodiments.

FIG. 6 is a top-down view of patch element 66 in antenna 40 of FIG. 5 (e.g., as viewed in the direction of arrow 108 of FIG. 5). The other portions of device 10 have been omitted from FIG. 6 for the sake of clarity. As shown in FIG. 6, patch element 66 may include first conductive traces 78 on first dielectric wall 80 (FIG. 5), second conductive traces 90 on the underlying sensor board 88, and conductive interconnect structure 92 that couples first conductive traces 78 to second conductive traces 90. Central axis 98 may extend through second conductive traces 90.

First conductive traces 78 may have an outer edge. First conductive traces 78 may also have an inner edge 112 opposite the outer edge. Second conductive traces 90 may have an (outer) edge 110. First conductive traces 78 may laterally extend along a loop-shaped path extending around a central axis 98 (e.g., parallel to the Z-axis) and around second conductive traces 90. Positive antenna terminal 58 may be coupled to first conductive traces 78 (e.g., at the outer edge of conductive traces 78). Inner edge 112 of first conductive traces 78 may be laterally separated from edge 110 of second conductive traces 90 (as shown in the example of FIG. 6) or, if desired, first conductive traces 78 may at least partially overlap second conductive traces 90 (e.g., inner edge 112 of first conductive traces 78 may overlap second conductive traces 90 and/or edge 110 of second conductive traces 90 may overlap first conductive traces 78). Conductive interconnect structure 92 may configure first conductive traces 78, second conductive traces 90, and the conductive interconnect structure to electrically form a single integrated patch element 66 for antenna 40.

The example of FIG. 6 is merely illustrative. The edges of conductive traces 78 and 90 may have other shapes (e.g., having any desired number of curved and/or straight segments). The shapes of conductive traces 78 and 90 may, for example, conform to the lateral shape of device 10. If desired, additional conductive interconnect structures 92 may be disposed at other locations around central axis 98 to couple inner edge 112 of first conductive traces 78 to edge 110 of second conductive traces 90 at more than one point.

Figure 7:
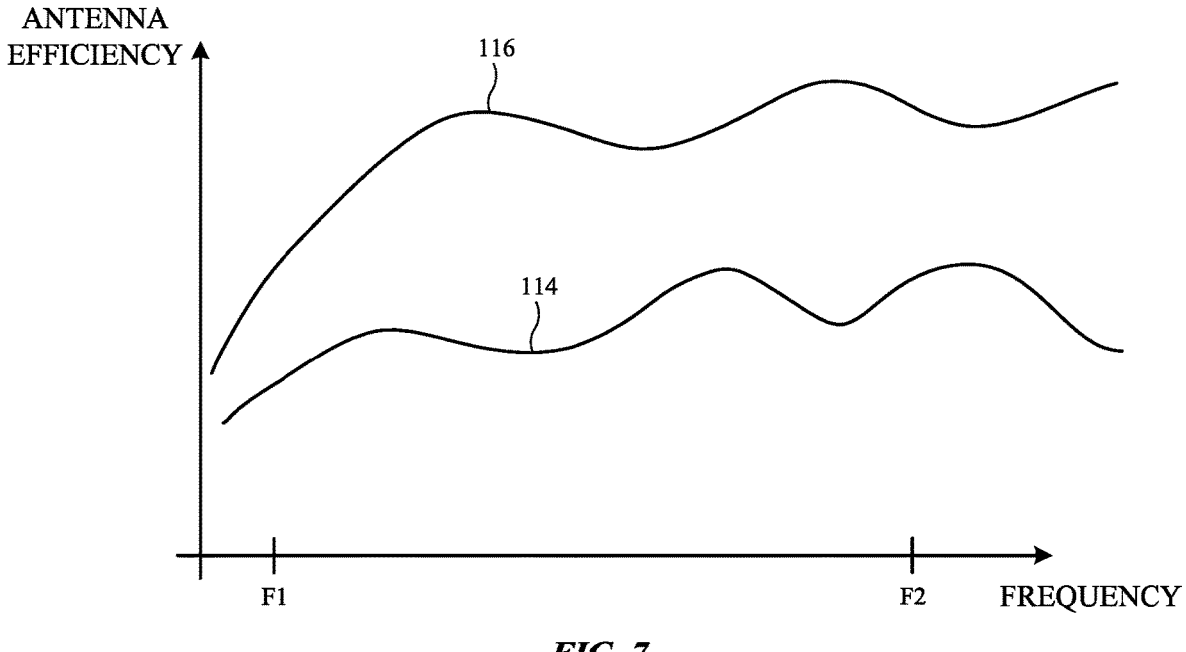
FIG. 7 is a plot of antenna performance (antenna efficiency) as a function of frequency showing how moving a charging coil out of the volume of an illustrative antenna of the type shown in FIGS. 2-6 may optimize performance of the antenna in accordance with some embodiments.

FIG. 7 is a plot of antenna performance (antenna efficiency) as a function of frequency showing how antenna 40 of FIGS. 2-6 may exhibit improved wireless performance relative to scenarios where coil structures 44 are mounted within antenna volume 86 of antenna 40 (FIG. 5). Curve 114 of FIG. 7 plots the antenna efficiency of antenna 40 in implementations where coil structures 44 are mounted within antenna volume 86 of antenna 40 (e.g., in implementations where coil structures 44 are not disposed within sensor cavity 84 and laterally surrounding sensor board 44). As shown by curve 114, the antenna exhibits relatively low antenna efficiency within a frequency band between frequencies F1 and F2 in these implementations.

Curve 116 of FIG. 7 plots the antenna efficiency of antenna 40 as shown in FIG. 5. As shown by curve 116, antenna 40 exhibits substantially higher efficiency in these implementations. Moving coil structures 44 out of antenna volume 86 and/or distributing patch element 60 between conductive traces 78 and 90 (e.g., as shown in FIGS. 5 and 6) may serve to maximize the antenna efficiency between frequencies F1 and F2. Frequency F1 may be, for example, 500 MHz whereas frequency F2 is 3000 MHz. This may, for example, allow antenna 40 to cover the cellular LB and the cellular HB (as well as any bands between frequencies F1 and F2) with satisfactory levels of performance. The example of FIG. 7 is merely illustrative. Curves 114 and 116 may have other shapes in practice and frequencies F1 and F2 may be any desired frequencies.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device comprising:
a display;
a housing wall opposite the display;
a first conductive trace patterned on a surface of the housing wall;
a sensor board having a first surface facing the display and a second surface opposite the first surface and facing the housing wall;
a second conductive trace patterned on the first surface of the sensor board; and
an antenna having an antenna ground and having an antenna resonating element configured to radiate through the housing wall, wherein the antenna resonating element comprises the first conductive trace patterned on the surface of the housing wall and the second conductive trace patterned on the first surface of the sensor board.

2. The electronic device of claim 1, wherein the antenna resonating element further comprises a conductive interconnect that couples the first conductive trace to the second conductive trace.

3. The electronic device of claim 2, further comprising a positive antenna feed terminal coupled to the first conductive trace.

4. The electronic device of claim 1, wherein the housing wall has a first dielectric portion and a second dielectric portion that protrudes away from the first dielectric portion to define a cavity, the sensor board being disposed at least partially within the cavity.

5. The electronic device of claim 4, further comprising:
a coil disposed extending around the sensor board, wherein the coil is different from the antenna; and
wireless power receiver circuitry configured to receive wireless charging signals using the coil.

6. The electronic device of claim 5, wherein the antenna resonating element and the antenna ground define a volume of the antenna, the coil being disposed within the cavity and outside the volume of the antenna.

7. The electronic device of claim 1, wherein the electronic device has a central axis that extends through the second conductive trace, the first conductive trace following a loop path that extends laterally around the central axis.

8. The electronic device of claim 1, wherein the sensor board comprises an optical sensor configured to transmit and receive light through the housing wall.

9. The electronic device of claim 1, wherein the first conductive trace and the second conductive trace are configured to resonate in a frequency band greater than or equal to 600 MHz.

10. The electronic device of claim 9, further comprising:
a coil configured to receive wireless power through the rear housing wall at a frequency less than 100 MHz, wherein the coil is different than the antenna resonating element, the coil laterally surrounds the sensor board and a central axis, and conductive material in the coil at least partially overlaps the first conductive trace as viewed along a normal axis of the display.

11. An electronic device comprising:
a display;

18 a housing having a dielectric housing wall opposite the display, the dielectric housing wall having a protrusion that defines a cavity;
a printed circuit board disposed at least partially within the cavity, wherein the printed circuit board has a first surface facing the display and a second surface opposite the first surface and facing the dielectric housing wall; and
an antenna having a patch element, an antenna ground, and a positive antenna feed terminal coupled to the patch element, wherein the patch element includes a first conductive trace patterned on a surface of the dielectric housing wall, a second conductive trace patterned on the first surface of the printed circuit, and a conductive interconnect that couples the first conductive trace to the second conductive trace.

12. The electronic device of claim 11, further comprising:
a coil that is different from the antenna and that is disposed within the cavity and extending around the printed circuit board; and
wireless power receiver circuitry configured to receive wireless charging signals using the coil.

13. The electronic device of claim 12, wherein the patch element is separated from the antenna ground by a volume of the antenna, the coil being disposed external to the volume of the antenna.

14. The electronic device of claim 11, further comprising a sensor mounted to the second surface of the printed circuit board.

15. The electronic device of claim 11, wherein the first conductive trace has an inner edge, the second conductive trace has an outer edge, and the conductive interconnect couples the inner edge of the first conductive trace to the outer edge of the second conductive trace.

16. The electronic device of claim 15, wherein the conductive interconnect comprises a bent piece of metal.

17. The electronic device of claim 15, wherein the inner edge overlaps the second conductive trace as viewed along a normal axis of the display.

18. The electronic device of claim 11, wherein the first conductive trace and the second conductive trace are configured to convey an antenna current at a frequency greater than or equal to 600 MHz, the conductive interconnect being configured to pass the antenna current between the first and second conductive traces.

19. A wristwatch comprising:
conductive sidewalls;
a display mounted to the conductive sidewalls;
a dielectric wall opposite the display, wherein the dielectric wall has a first portion mounted to the conductive sidewalls and has a second portion that protrudes from the first portion and that defines a cavity;
a circuit board in the cavity;
a coil in the cavity and extending around the circuit board;
a first conductive trace on the circuit board;
a second conductive trace on the first portion of the dielectric wall;
a conductive interconnect that couples the first conductive trace to the second conductive trace, wherein the conductive interconnect comprises a piece of metal that has a first end coupled to the second conductive trace, a second end opposite the first end, and a bend between the first end and the second end, the second end is bent towards the display, and the bend contacts the first conductive trace; and an antenna having a radiating element that includes the first conductive trace, the second conductive trace, and the conductive interconnect.

20. The wristwatch of claim 19, further comprising a sensor on the circuit board, wherein the antenna has a positive antenna feed terminal coupled to the first conductive trace and the conductive interconnect comprises a conductive bracket.

\* \* \* \* \*